Sept. 23, 1969 R. P. SHIVELY ET AL 3,469,249
MEMORY FOR SIMULTANEOUSLY STORING FIXED
AND ELECTRICALLY ALTERABLE INFORMATION
Filed June 14, 1966
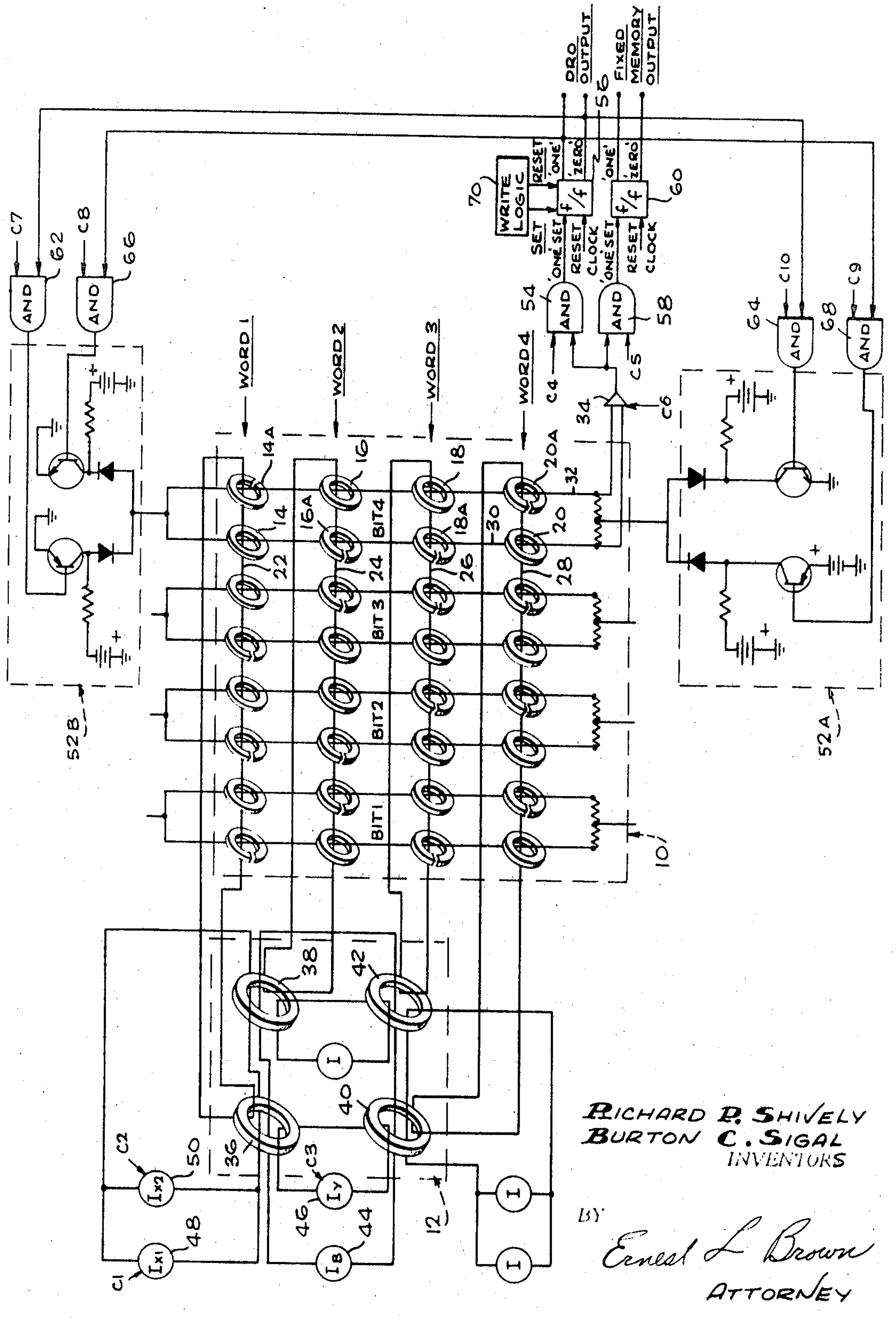
RICHARD P. SHIVELY
BURTON C. SIGAL
INVENTORS
BY
Ernest L. Brown
ATTORNEY United States Patent Office 3,469,249

Patented Sept. 23, 1969

3,469,249
MEMORY FOR SIMULTANEOUSLY STORING FIXED AND ELECTRICALLY ALTERABLE INFORMATION

Richard P. Shively and Burton C. Sigal, Los Angeles, Calif., assignors to Litton Systems, Inc., Beverly Hills, Calif., a corporation of Maryland Filed June 14, 1966, Ser. No. 557,469
Int. Cl. G11b *5/00*
U.S. Cl. 340—174 21 Claims

ABSTRACT OF THE DISCLOSURE

A memory for simultaneously storing electrically alterable and fixed information in an array comprising but a single core per bit. The memory includes ferromagnetic storage cores arranged in sets of bits to form words of storage, with each word of storage being threaded by a separate word drive line; and with a separate pair of sensing lines threading the same bit position of each word, thereby forming two-bit locations per bit. A core is provided at only one of the two-bit locations for each bit according to a fixed memory program. Electrically alterable information is stored in the form of one or the other of the two remanent states of magnetization of the cores, and means are provided for reading out, storing and re-writing the alterable information, said last mentioned means being coupled to both sensing lines of each pair of sensing lines. Additional means, responsive to only a single one of the sensing lines of each pair of sensing lines, is provided for reading the fixed information.

This invention pertains to a computer memory, and more particularly to a computer memory which uses ferromagnetic storage cores.

Typically ferromagnetic storabe cores are adapted to be set into one or the other remanent states, the particular remanent state being indicative of the presence or absence of a "1" in that particular unit of storage. To determine if the storage core contains a "1," the storage cores are driven toward their remanent state which corresponds to a "0." If the core is already in its "0" remanent state, substantially no signals are generated on a sensing line. However, if the core is in its "1" remanent state, the driving of the core into its "0" remanent state generates a signal in the sensing line indicating that the particular storage core contained a "1." The interrogating of the storage core destroys the information in the core. Consequently, the information must be stored temporarily and rewritten back into the storage core. Such a reading is called a "destructive readout" or "DRO."

Many computers also have a fixed, "read only" memory which is permanently wired. Such a memory is used for storing program constants, tables, and the like. The existence of a "1" is evidenced by the existence of a ferromagnetic core. One example of such a fixed memory is the so-called "rope" memory. When the core is interrogated by driving it from one remanent state to the other, a signal appears on a sensing line, evidencing a "1." Should there be no core (or should the core be broken or shorted) to be driven, no signal appears on a sensing line, evidencing a "0."

The mechanism contemplated by this invention is adapted to store both fixed memory information and alterable data (or DRO) information in the same storage cores. Two sensing lines designated "1" and "0" are used for each bit position. The value of the fixed information depends upon the linking of the storage core by one or the other of the two sensing lines and the position of the core on the sense line with respect to the word line. Thus the structure establishing the content of the fixed information is relatively permanently mechanized and this structure is hereinafter referred to as the fixed memory. The DRO information is stored in the usual manner. To read out of the fixed information, the DRO information is first read out into a temporary storage register. The cores are then reset into a "1 state." Next the cores of the selected word are interrogated while the "0" sense line is blocked so that only the presence of a core on a "1" line generates a signal out of the sense amplifier.

With the mechanism of this invention, a single matrix of memory cores can be used as a means for storing fixed or read only data, and also as an alterable data standard DRO memory core.

It is therefore an object of this invention to use ferromagnetic storage cores simultaneously for fixed and alterable storage.

It is another object of this invention to use a single matrix of ferromagnetic storage cores as a fixed data and an alterable data memory.

It is a more specific object of this invention to provide apparatus which is adapted to achieve the above enumerated objects.

Other objects will become apparent from the following description, taken in connection with the accompanying drawing in which the only figure is a diagram, partially schematic and partially in block form, of a portion of a typical memory fabricated in accordance with this invention.

In the figure is shown a device of this invention driven by apparatus of the kind which is described and claimed in patent application Ser. No. 529,319, filed Feb. 23, 1966 by Richard P. Shively and David V. Dickey and assigned to Litton Systems, Inc. for a "Linear Select Device.'

In the shown device of this invention, a plurality of ferromagnetic storage cores 10 are adapted to be driven by a plurality of driving cores or "line drivers" 12. In a typical configuration, the ferromagietic storage cores 10 are arranged in a matrix in which all of the storage cores corresponding to the different bits in a given word or storage are driven by a common conductor. Further, all of the cores corresponding to a particular designated bit position in a plurality of the words are driven in common.

In FIGURE 1 is shown a matrix of storage cores representing four words, each having four bit positions per word. The words are numbered, for convenience, consecutively from top to bottom in the figure. The bit positions are numbered, for convenience, from left to right in the figure.

Referring to the bit 4 position, a plurality of ferromagnetic cores 14, 16, 18 and 20 correspond to the bit 4, words 1, 2, 3 and 4 positions, respectively. Conductors 22, 24, 26 and 28 form a first set of conductors having a plurality of current conductors with each of the conductors linking a separate core of the plurality of ferromagnetic cores 14, 16, 18 and 20. Each of the cores 14, 16, 18 and 20 link only a programmed one of two current conductors 30 and 32 of a second set of conductors. A sensing means comprising an amplifier 34, which is adapted to sense the signals on both lines 30 and 32 due to changes in remanent state of cores 14, 16, 18 or 20, is connected to conductors 30 and 32 and further comprise a means for selectively inhibiting the sensing means 34 (for example—by gates, or the like) to block the sensing on a predetermined one of the conductors 30 and 32 (for example, blocking the sensing on line 32).

The driving cores 12 are a means for selectively driving read and write current through the conductors 22, 24, 26 and 28 of the first set of conductors. Each of the linear select cores 36, 38, 40 and 42 are linked to drive current through a different one of the conductors 22, 24, 28 and 26, respectively. Each of the linear select cores 36, 38, 40 and 42 are threaded by a bias current from a bias source 44 which is adapted to drive the linear select cores far into the saturation region of a predetermined remanent state. The coincidence of current from a column current source 46 and a two-magnitude row current source (which is shown as two parallel current sources 48 and 50), in opposition to the effect of bias current source 44, causes linear select core 36 to change remanent state and to drive a read current into conductor 22. The current from current source 46, 48 and 50 are adapted to be removed separately or simultaneously as described hereinafter. Other row and column current sources for selecting other linear select cores than 36 are shown for completeness of the drawing. The magnitude of the current of current source 50 is such that with the current from current sources 46, 48 and 50 applied, the removal of current from current source 50 does not cause linear select core 36 to change remanent state. The further removal of the current of current source 48 causes linear select core 36 to change back to its original remanent state at a relatively slow rate of speed. The simultaneous removal of current from current source 46, 48 and 50 causes the remanent state of core 36 to change back into its original remanent state at a rapid rate. The operation of the linear select cores 36, 38, 40 and 42, together with its associated current sources are described more completely in patent application Ser. No. 529,319, filed Feb. 23, 1966 by Richard P. Shively and David V. Dickey for a "Linear Select Device."

A bi-directional current source 52A and 52B is adapted to drive digit current in one direction or another through both line 30 and 32 to inhibit or enhance the writing of DRO information into storage cores 14, 16, 18 and 20.

The output of sensing means 34 is connected through an AND gate 54 to one flip flop 56 of a flip flop register (not shown) or through an AND gate 58 to one flip flop 60 of a second flip flop register (not shown). Gates 54 and 58 are connected to a computer control mechanism (not shown) to operate gate 54 and 58 in accordance with signals C4 and C5, respectively. The outputs of flip flop 56 are connected through AND gates 62, 64, 66 and 68 to control current source 52A, 52B in accordance with the output of flip flop 56 and in synchronism with signals C7, C8, C9, and C10, respectively. Flip flop 56 is further adapted to be set or reset by an exterior source designated "write logic" 70. Both flip flops 56 and 60 are adapted to be reset by reset signals from a centralized control (not shown).

Similar mechanisms to current sources 52A, 52B, sensing mechanism 34, and elements 54 through 70 are connected to the digit lines corresponding to bit 1, bit 2, and bit 3.

To cause the two digit lines 30 and 32 to thread the preselected cores 14, 16, 18 and 20, the lines may be threaded as shown, or, alternatively, each line may thread a core for each of words 1, 2, 3 and 4, then preselected one of those cores may be shorted or broken as described in patent application, Ser. No. 510,004, filed Nov. 26, 1965 by Richard P. Shively and assigned to Litton Systems Inc. entitled "Memory." Examples of broken core structures are shown at 14A, 16A, 18A and 20A.

In the matrix 10, the fixed memory information which is shown is 0001 for word 1, 1010 for word 2, 0110 for word 3, and 1111 for word 4.

Initially all of the cores are set into a remanent state corresponding to a DRO "0." All of the flip flops of the registers, of which flip flops 56 and 60 are a part, are initially "reset" to "0."

Suppose it is desired to set storage core 14 into a DRO remanent state corresponding to a "1." The write logic circuits 70 would set the flip flop 56 into its "1" state. The current sources 46, 48 and 50 would simultaneously be energized to cause linear select core 36 to change remanent states which generates a current in conductor 22 linking all of the storage cores in word 1. Each of the storage cores in word 1 is driven toward its "0 state." Because all of the cores of word 1 are already in their "0 state," no voltage (except shuttle voltage) is energized in any of the sensing lines and none of the flip flops in the DRO register, including flip flop 56, have their outputs altered. The current of current source 50 is first extinguished, which is insufficient to cause the remanent state of core 36 to change. The current of current source 48 is next extinguished which causes the remanent state of core 36 to change in a gentle manner to drive a current through conductor 22 in a direction tending to alter the remanent state of all of the storage cores of word 1, but which is insufficient by itself to alter the remanent states of those cores. The outputs of gates 66 and 68 cause current source 52A and 52B to channel current through the sensing lines 30 and 32 of a magnitude which is insufficient to modify the remanent state of cores 16, 18 and 20, but which is sufficient when combined with the effect of the current in line 22 to change the remanent state of core 14 into its "1" state. At that time, the DRO information in the memory will be 0001 for word 1, and 0000 for words 2, 3 and 4.

After the write sequence, the reset clock (not shown) resets flip flop 56 into its zero state.

Assume now that it is desired to read out the DRO information in word 1. Again current source 46, 48 and 50 are energized as described for the "write" sequence. However, now storage core 14 is driven from its "1 state" into its "0 state" which causes a signal to be delivered through conductor 30 to sensing amplifier 34. The signal at the output of amplifier 34 is supplied through gate 54 to flip flop 56 (which had previously been reset by a timing pulse) to set flip flop 56 into its 1 state. The binary state of flip flop 56 is then a measure of the DRO information in bit 4 of word 1. Immediately after reading out the information in core 14, the current of current source 50 is reduced to 0, and soon thereafter the current in current source 48 is returned to 0 which causes a "write" pulse of current to be channeled through conductor 22. Flip flop 56 controls current amplifiers 52A and 52B to cause the concurrence of current in conductors 30 and 22 to reset core 14 into its "1 state."

When it is desired to read out the fixed memory information in word 1, current is applied by current sources 46, 48 and 50 to cause the remanent state of linear select core 36 to change, thereby driving a "read current" through conductor 22. All of the cores in word 1 are driven toward their "0 state." The DRO information is thus read out of all the cores of word 1, including core 14. The change in remanent state of core 14 causes a signal to be applied to amplifier 34. The control signal C4 causes gate 54 to open and to store the DRO information into flip flop 56. Immediately after the "read pulse" of current in conductor 22, the current is simultaneously extinguished in current sources 46, 48 and 50 which causes a pulse of "reset current" to flow through conductor 22 and the cores of word 1 setting the cores of word 1 into their "1" remanent state. Immediately after the cores of word 1 are set into their "1 state," current is applied by current sources 46, 48 and 50 causing all of the cores in word 1 to be driven toward their "0 state." Thus, all of the cores of word 1 cause signals to be applied to the sensing lines which they link. The signal on line 30 is applied to amplifier or sensing means 34. The control signal C5 opens gate 58 to allow the signal to "1 set" flip flop 60 which is the bit 4 flip flop of a fixed memory register (not shown). The binary state or flip flop 60 is an indication of bit 4 of the fixed memory information. Immediately after "reading out" the fixed memory information, the DRO information is restored into the cores of word 1 of the memory 10 by removing the current of current source 50, 48 and 46 consecutively in steps as described above.

In a "read only" mode of operation, should a bit of fixed information be a "0" (for example, bit 4 of word 2), the signal C6 causes sensing amplifier 34 to block signals due to changes in remanent state of core 16, thereby registering a "0" into flip flop 60.

Thus, the ferromagnetic cores may simultaneously hold DRO and fixed memory information, the DRO information being represented by the remanent state of the storage cores and the fixed memory information being represented by the relationship between the sensing line and the word line that links the cores. The sensing lines are connected substantially in parallel for DRO read out with the predetermined "0 line" blocked during fixed memory read out. To read out the fixed memory, the DRO information must be first transferred to a temporary storage register and the cores set or cocked to generate a signal when triggered.

Although the storage memory is shown as a two-dimensional matrix, obviously it may be arranged in a three-dimensional matrix. Although the core matrix is shown driven by ferromagnetic cores, it may be driven by electronics, magnetic amplifiers, and the like. Although the invention is shown arranged, for convenience, in a matrix form, the geometrical arrangement of the storage cores is not critical. Further, although the invention has been described with one coordinate representing a "word" and the other coordinate representing a "bit," obviously the two coordinates may merely be considered "X" and "Y" coordinates and the word and bit designations may be interchanged. Still further, although one particular digit current source circuit is shown at 52A and 52B, obviously other current source types may be used. It is also apparent that although transistorized controls have been shown, vacuum tubes, and other control devices may be used. Also although flip flops 56 and 60 are shown for the temporary memory, other temporary memories, (for example, delay lines), may be used.

Although the invention has been described in detail above, it is not intended that the invention should be limited by the description but only in accordance with the spirit and scope of the appended claims.

We claim:

1. In a memory for storing and reading out fixed and electrically alterable information:
- a plurality of ferromagnetic memory cores, each core corresponding to a single bit of memory storage;
- at least one pair of sensing lines, said pair of sensing lines associated with a particular bit location in each word of memory storage; and each core, associated with said particular bit location of each word of storage, being coupled to a selected one of said pair of sensing lines in accordance with a fixed memory program;
- first means for selectively switching the remanent magnetic state of selected storage cores;
- second means, coupled to said pair of sensing lines, for reading out the electrically alterable information of a selected bit during some of the change of remanent state periods of the storage core associated with said selected bit; and
- third means for reading out, from one of the sensing lines of said pair of sensing lines, the fixed information of said selected bit during other of the change of remanent state periods of the storage core associated with said selected bit.

2. The device of claim 1 wherein said second means for reading out said electrically alterable information includes means for sensing the remanent magnetic state of the core associated with said selected bit.

3. The device of claim 2 wherein said third means includes means for sensing the presence or absence of the storage core, associated with said selected bit, on said one of said pair of sensing lines.

4. The device of claim 1 wherein said third means includes means for sensing the presence or absence of the storage core, associated with said selected bit, on said one of said pair of sensing lines.

5. The device of claim 2 further comprising means for temporarily storing, externally to said cores, said electrically alterable information prior to reading out said fixed information.

6. The device of claim 3 in which said first means includes means for setting the storage core associated with said selected bit a to a selected one of said remanent states prior to reading out said fixed information.

7. The device of claim 5 further comprising means for writing said temporarily stored electrically alterable information back into said storage cores after reading out said fixed information.

8. The device of claim 1 wherein said third means includes means for blocking the sensing of a signal on the other of said pair of sensing lines.

9. The device of claim 1 wherein said first means includes a plurality of word lines, each of said word lines associated with a particular word of storage; and word drive means for selectively driving reading and writing currents through said word lines.

10. The device of claim 9 further comprising means for selectively driving currents through said pair of sensing lines to inhibit or enhance the action of said writing current in said word lines.

11. The device of claim 3 wherein said third means includes means for blocking the sensing of a signal on the other of said pair of sensing lines.

12. The device of claim 11 further comprising means for temporarily storing, externally to said cores, said electrically alterable information prior to reading out said fixed information.

13. The device of claim 12 wherein said first means includes means for setting the storage core associated with said selected bit, to a selected one of its remanent states prior to reading out said fixed information.

14. The device of claim 13 further comprising means for writing said temporarily stored electrically alterable information back into said storage cores after reading out said fixed information.

15. A memory comprising:
- a plurality of ferromagnetic storage cores arranged to form sets of bits in each of a plurality of words of storage;
- a plurality of word drive lines, each drive line threading the cores associated with a different word of storage;
- a plurality of pairs of sensing lines, with each pair of sensing lines forming two-bit-locations-per-bit in each word of storage, in those areas where a sensing line meets with one of said word driving lines;
- only one operative core associated with the two bit locations for each bit of storage, with each core of each bit being coupled to one sensing line of a pair of sensing lines in accordance with a fixed information program;
- first means coupled to each of said pairs of said sensing lines for storing electrically alterable information in the form of one of the two remanent staes of magnetization of said cores;
- second means coupled to each of said pairs of sensing lines for reading out the electrically alterable information by sensing the remanent magnetic state of said cores; and
- third means for reading out said fixed information by sensing the presence or absence of a storage core on a selected one of said sensing lines of each pair of sensing lines.

16. The memory of claim 15 wherein said third means includes means for blocking readout from the other of said sensing lines in each of said pairs of sensing lines during readout of said fixed information.

17. The memory of claim 16 further comprising means for temporarily storing said electrically alterable information prior to reading out said fixed information from said cores.

18. The memory of claim 17 further comprising means for rewriting said temporarily stored information into said cores after readout of said fixed information.

19. The memory of claim 18 further comprising means for setting said cores to a selected one of their remanent magnetic states prior to readout of said fixed information.

20. The memory of claim 17 wherein said means for temporarily storing the electrically alterable information includes a register of flip flops.

21. The device of claim 18 wherein said means for rewriting includes current sources connected in parallel to each of said pair of sensing lines.

References Cited

UNITED STATES PATENTS

| | | | |
|---|---|---|---|
| 3,142,049 | 7/1964 | Crawford | 340—174 |
| 3,396,373 | 8/1968 | Didic | 340—174 |

BERNARD KONICK, Primary Examiner

GARY M. HOFFMAN, Assistant Examiner